(12) United States Patent
Hamada et al.

(10) Patent No.: US 6,690,119 B2
(45) Date of Patent: Feb. 10, 2004

(54) PHOSPHOR, METHOD FOR PREPARING PHOSPHOR LAYER AND VACUUM FLUORESCENT DISPLAY

(75) Inventors: Takuya Hamada, Mobara (JP);
Kazunori Kitagawa, Mobara (JP);
Hitoshi Toki, Mobara (JP)

(73) Assignee: Futaba Corporation, Chiba-ken (JP)

( * ) Notice: Subject to any disclaimer, the term of this patent is extended or adjusted under 35 U.S.C. 154(b) by 0 days.

(21) Appl. No.: 10/229,116

(22) Filed: Aug. 28, 2002

(65) Prior Publication Data

US 2003/0057863 A1 Mar. 27, 2003

(30) Foreign Application Priority Data

Aug. 30, 2001 (JP) ........................................ 2001-261625

(51) Int. Cl.[7] ................................................. G09G 3/10
(52) U.S. Cl. ............. 315/169.4; 313/496; 252/301.4 R; 252/301.4 P
(58) Field of Search ............................ 315/169.3, 169.4; 252/301.4 R, 301.4 P; 313/484, 495, 496, 497, 306

(56) References Cited

U.S. PATENT DOCUMENTS

| | | | | | |
|---|---|---|---|---|---|
| 4,595,862 | A | * | 6/1986 | Morimoto et al. | 315/169.4 |
| 4,666,548 | A | * | 5/1987 | Eto et al. | 156/286 |
| 5,433,888 | A | * | 7/1995 | Okada et al. | 252/301.4 R |
| 5,523,018 | A | * | 6/1996 | Okada et al. | 252/301.4 P |
| 5,789,858 | A | * | 8/1998 | Itoh et al. | 313/495 |

* cited by examiner

Primary Examiner—Don Wong
Assistant Examiner—Thuy Vinh Tran
(74) Attorney, Agent, or Firm—Breiner & Breiner, L.L.C.

(57) ABSTRACT

A phosphor without using cadmium having excellent luminous characteristic which emits a light in the visible region. The phosphor is prepared by mixing 1% of $B_2O_3$ powder and 10% of $In_2O_3$ with CaS:Eu, Ce phosphor to prepare a mixture to which is added vehicle containing an organic binder to form paste. The vacuum fluorescent display using the phosphor exhibits lifetime performance and initial luminance superior to the fluorescent display in which a phosphor without using cadmium is applied.

5 Claims, 7 Drawing Sheets

PHOSPHOR, METHOD FOR PREPARING PHOSPHOR LAYER AND VACUUM FLUORESCENT DISPLAY

BACKGROUND OF THE INVENTION

1. Field of the Invention

The present invention relates to a phosphor emitting a light in the region from yellow to red without using cadmium.

2. Description of the Prior Art

Since a phosphor material for a vacuum fluorescent display currently used which emits a light in the region of from yellow to red contains cadmium, it has been required not to use cadmium which adversely affects on environment. For this end, $Y_2O_2S:Eu$, $Y_2O_3:Eu$ (red) phosphor has been proposed as a cadmium-free phosphor. However, such a cadmium-free phosphor is disadvantageous in that the luminance and lifetime performance are extremely inferior to those of the current cadmium-containing phosphor. At present, the cadmium-free phosphor which satisfies the requirements of the market has not been proposed.

On the other hand, a phosphor containing alkaline earth metal as a matrix was conventionally known. CaS:Eu and CaS:Eu, Ce phosphors emit a light in red. The luminescent color can be changed to orange color by forming a solid solution of CaS:Eu and CaS:Eu, Ce phosphors with Sr. The CaS:Ce phosphor emits a light in green and CaS:Ce, Na phosphor emits a light in blue. However, these conventional phosphors are disadvantageous in that these phosphors are easily decomposed by moisture under normal usage environment.

In a process of manufacturing a vacuum fluorescent display using the phosphor at anodes of a luminescent section of the vacuum fluorescent display, there is a step for removing an organic binder by baking the phosphor applied usually at temperatures ranging from 450° C. to 550° C. This results in acceleration of the surface oxidation of a phosphor layer. If the surface oxidation of the phosphor layer is accelerated, S in the components of the phosphor is separated to scatter by the impact of collision with electron beam at the time of lightning of the vacuum fluorescent display, and the filament of the fluorescent display is adversely affected.

As one of the measures to solve such problems, there has been proposed a method for improving the reliability of the vacuum fluorescent display in which the phosphor layer is formed of an organic substance which can be decomposed in an atmosphere other than air, for example, in an atmosphere of nitrogen, and baked in an atmosphere of nitrogen to prevent the surface oxidation of the phosphor to eliminate adverse effect on the filament. However, this method has disadvantages in cost and control of the process, because of complexity of the baking step.

SUMMARY OF THE INVENTION

Accordingly, an object of the present invention is to provide a phosphor for emitting a light in the region of from yellow to red in good luminous characteristic without using cadmium.

According to a first aspect of the present invention, there is provided a phosphor containing as a matrix the sulfide of a metal belonging to Group II of the periodic table which is doped with dopant to emit a visible light, wherein the phosphor contains at least one element selected from the group consisting of B, Sb, Bi and P in 0.01% to 5.0% on the basis of the weight of the phosphor.

The matrix of the phosphor may be sulfide of an element selected from the group consisting of Mg, Ca, Zn and Sr belonging to Group II of the periodic table and doped with one or two of dopant selected from the group consisting of Eu, Ce and Mn.

In an alternative embodiment of the present invention, the matrix of the phosphor may be CaSrS and doped with one or two of dopant selected from the group consisting of Eu, Ce and Mn.

According to a second aspect of the present invention, there is provided a method of preparing a phosphor containing as a matrix sulfide of a metal belonging to Group II of the periodic table which is doped with dopant to emit a visible light, wherein at least one oxide selected from the group consisting of $B_2O_3$, $Sb_2O_3$, $Bi_2O_3$ and $P_2O_5$ is added to the phosphor, mixed and baked.

According to a third aspect of the present invention, there is provided a vacuum fluorescent display comprising an enclosed container maintained under high vacuum, an anode deposited a phosphor layer thereon and a cathode for emitting electrons to be impinged upon the phosphor layer of the anode, wherein the phosphor layer is formed of a phosphor which contains as a matrix the sulfide of a metal belonging to Group II of the periodic table and is doped with dopant to emits a visible light, and is obtained by adding to the phosphor at least one element selected from the group consisting of B, Sb, Bi and P in 0.01% to 5.0% on the basis of the weight of the phosphor, mixed and baked.

These and other objects features and advantages of the present invention will be more readily apparent from the detailed description of the preferred embodiments set forth below, taken in conjunction with the accompanying drawings.

DESCRIPTION OF THE REFERRED EMBODIMENTS

In order to resolve the instability in the heat-treating step for the sulfide of alkaline earth metal, materials capable of preventing surface oxidation has been examined according to the present invention. As a result of various kinds of experiments and consideration on the data obtained, it has been noted that the phosphor can be improved if at least one substance selected from the group consisting of $B_2O_3$, $Sb_2O_3$, $Bi_2O_3$ and $P_2O_5$ which is low-melting metal compound partly having vapor pressure at a temperature ranging from 450° C. to 550° C. corresponding to the temperature range employed at the baking step or glass melt containing one of the substances having glass transition temperature of 550° C. is added to the phosphor. The phosphor thus obtained prevents the surface oxidation of the phosphor, and improves the luminance performance if the phosphor is subjected to the baking step during the manufacture of the fluorescent display. As a result, the reliability of the fluorescent display can be improved, and the vacuum fluorescent display using a cadmium-free phosphor which emits a light in the region of from yellow to red in good luminous characteristic can be obtained.

EXAMPLE

Example 1

A starting material was prepared by adding 0.2 mol % of $Eu_2O_3$ as Eu and 0.1 mol % of $CeO_2$ as Ce to $CaCO_3$. Then, the starting material was sulfurated at a temperature of 1200° C. for five hours in an atmosphere of S to obtain CaS:Eu, Ce phosphor. The phosphor thus obtained to which was added 1% of $B_2O_3$ powder was used. 10% of $In_2O_3$ as a conductive material was added to the phosphor, then added vehicle containing an organic binder to form paste. The paste thus obtained was applied to a graphite electrode as an anode conductor of the vacuum fluorescent display to prepare a substrate. The substrate was baked at a temperature of 500° C. to remove the binder, then sealed together with a grid and a filamentous cathode in a hermetically sealed container to obtain the vacuum fluorescent display. For comparison, the same vacuum fluorescent display was prepared by using the same procedures as described above except that a phosphor without $B_2O_3$ was used.

Figure 7:
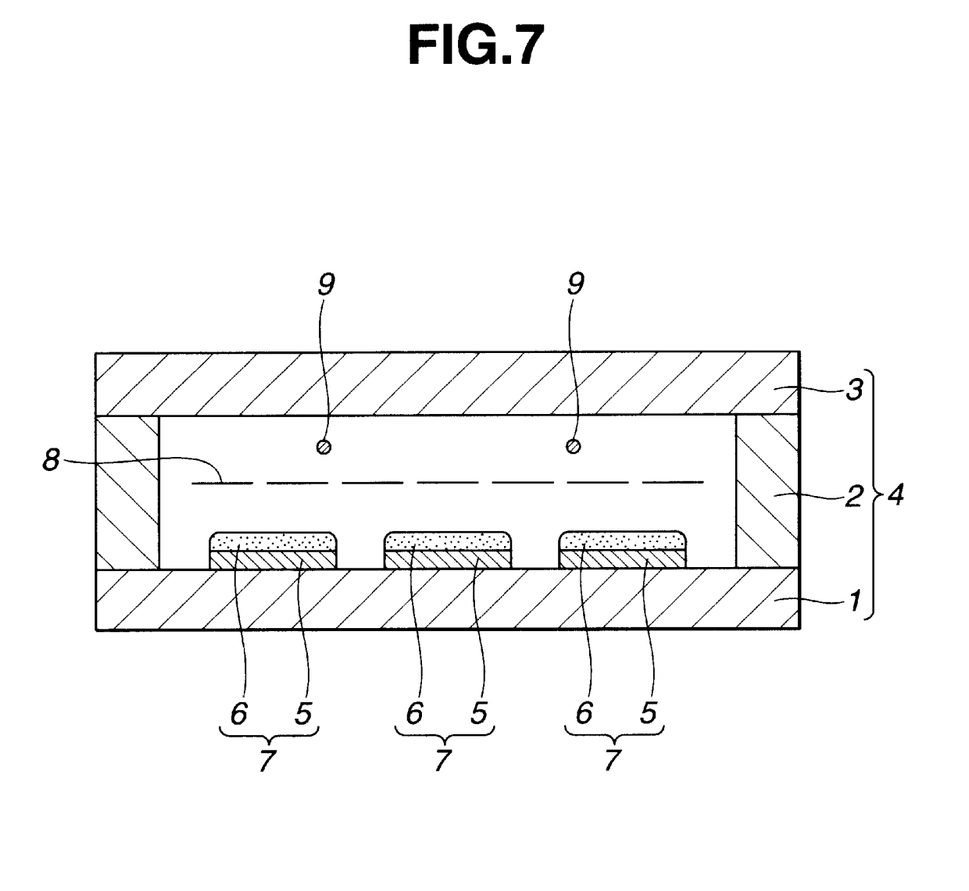
FIG. 7 is a cross-sectional view showing the structure of the vacuum fluorescent display according to an embodiment of the present invention.

FIG. 7 is a cross-sectional view showing the structure of the vacuum fluorescent display of Example 1. The vacuum fluorescent display comprises an enclosed container 4 formed by an anode substrate 1 made of glass, side plates 2 and an opposite substrate 3, the inside of which is set and maintained in high vacuum. An anode 7 comprising an anode conductor 5 having a predetermined display pattern connected to wire conductors (not shown) and a phosphor layer 6 formed on each anode conductor 5 are placed on the inner surface of the anode substrate 1. Inside the sealed container 4, a control electrode 8 is placed above the cathode 7. A filamentous cathode 9 as an electron source is stretched above the control electrode 8.

Figure 1:
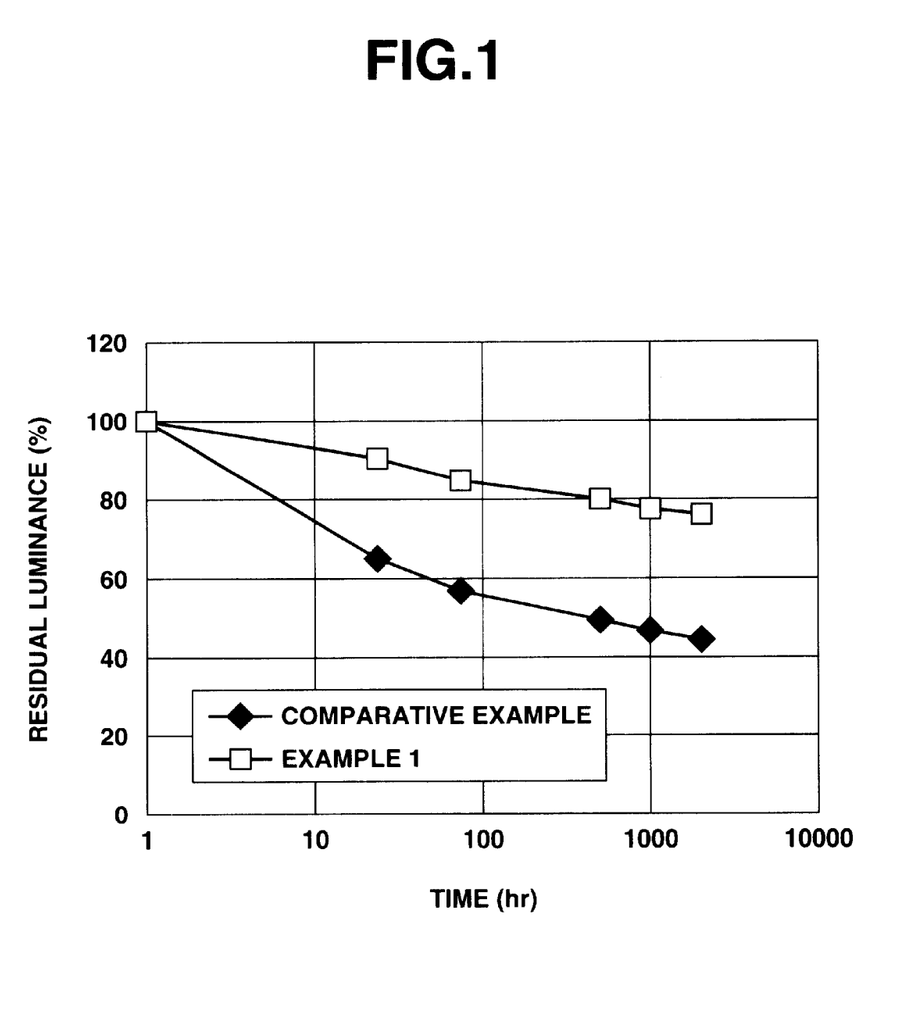
FIG. 1 is a graph showing results of the lifetime test according to Example 1 and Comparative Example.

The vacuum fluorescent display was driven at an anode voltage of 40V to emit a light, and lifetime performance and initial luminance were evaluated. The results of the lifetime test of Example 1 and Comparative example are shown in FIG. 1. The residual luminance after 1000 hours of Example 1 was 80%, while the residual luminance of Comparative example was 50%.

According to the result of evaluation on the initial luminance, the luminance of the phosphor emitting red light of Example 1 was about 200, while the residual luminance of Comparative example without $B_2O_3$ was 100. These phosphor surfaces were analyzed with ESCA (electron spectroscopy for chemical analysis). As a result, it was found that almost all of S on the surface of CaS was changed to $SO_4$ in the sample of Comparative example without using $B_2O_3$, while in the sample of Example 1 using $B_2O_3$ such value was suppressed to 20%.

Figure 2:
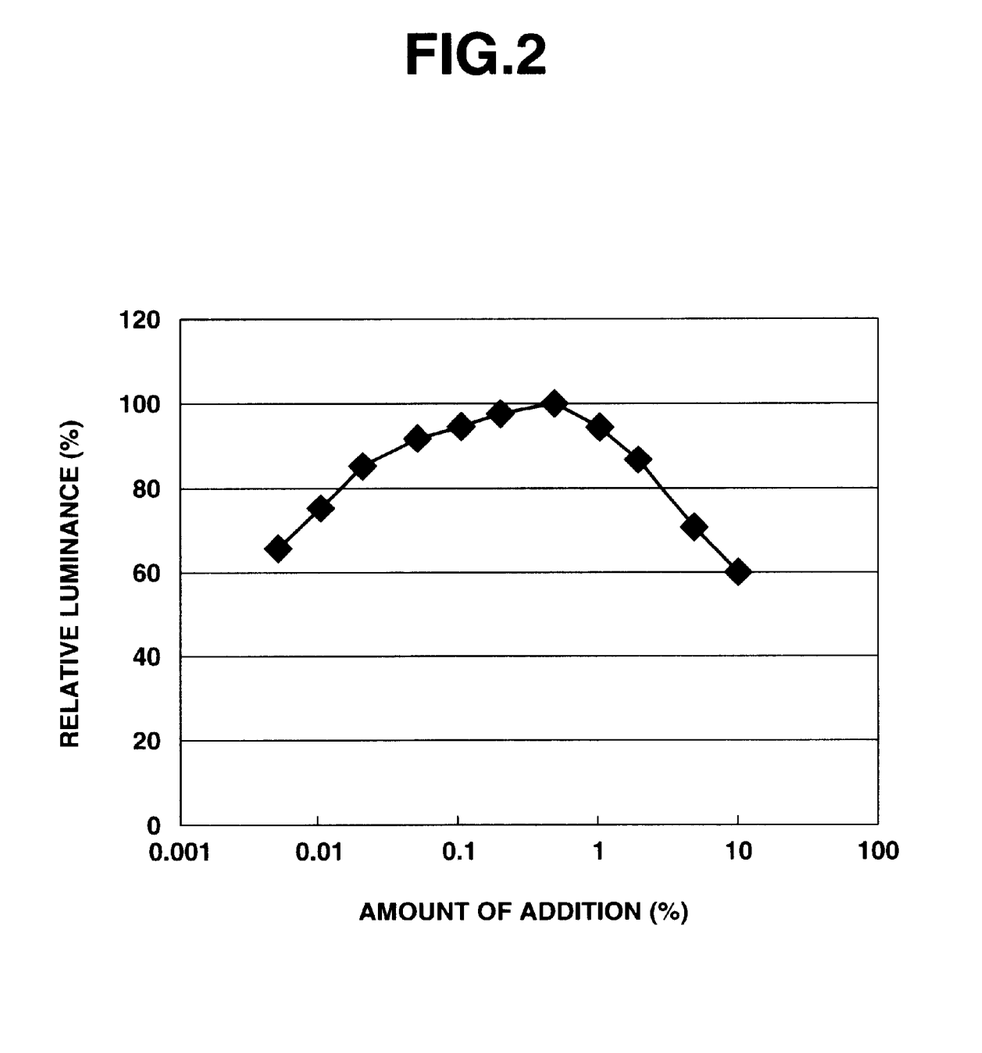
FIG. 2 is a graph showing a change in the initial luminance versus the change in the amount of addition of metal in Example 1.

The change in the initial luminance versus the change in the amount of addition of $B_2O_3$ in Example 1 is shown in FIG. 2. As shown in FIG. 2, when the amount of addition of $B_2O_3$ is 0.5%, the highest initial luminance (the position of relative luminance 100% in FIG. 2) can be obtained. The relative luminance of more than 70% including such a maximum value is particularly preferable for the phosphor of vacuum fluorescent display. In this instance, the range of the amount of the addition of $B_2O_3$ is 0.01%~7.0%.

Example 2

Figure 3:
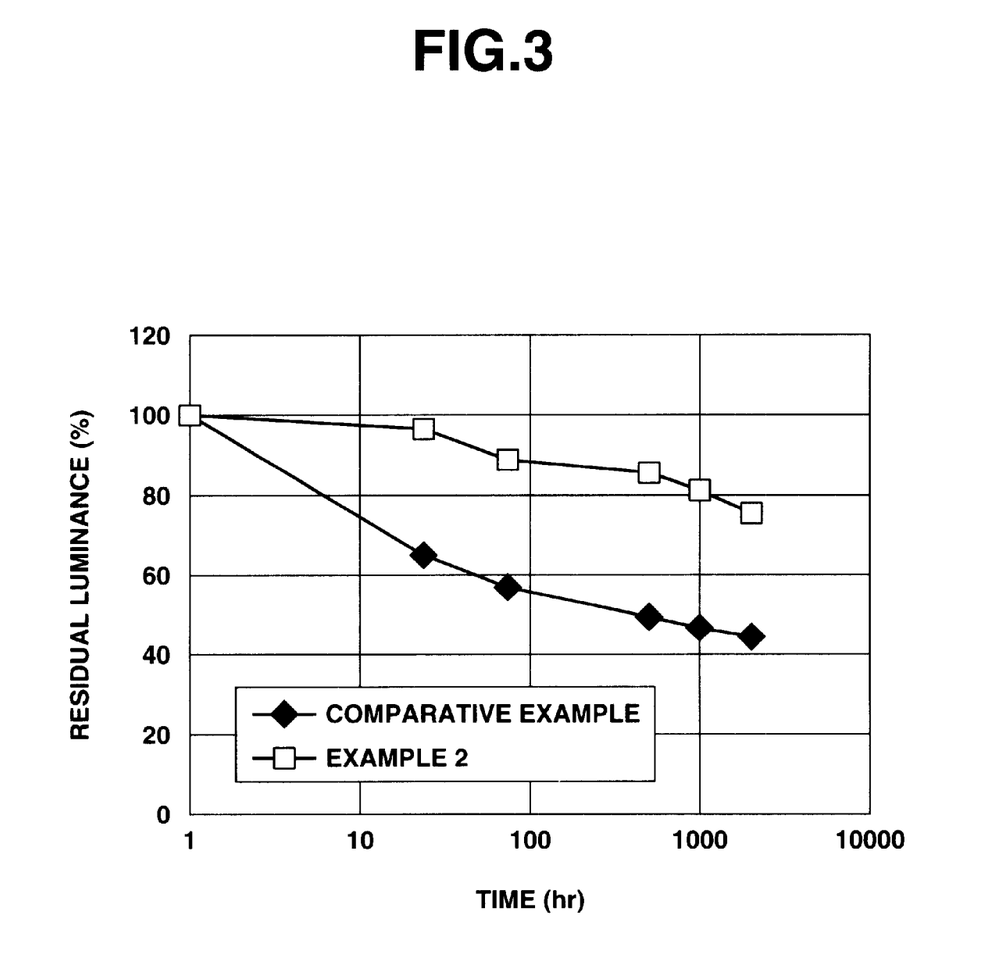
FIG. 3 is a graph showing results of the lifetime test according to Example 2 and Comparative Example.

CaS:Eu, Ce phosphor prepared by the same procedures as described in Example 1 to which was added 1% of $Sb_2O_3$ powder was used. 10% of $In_2O_3$ as a conductive material were added to the phosphor. A vacuum fluorescent display was made by using the phosphor in the same manner as described in Example 1. A vacuum fluorescent display similar to Example 1 without using $B_2O_3$ was prepared for comparison. The vacuum fluorescent displays of Example 2 and for comparison were driven to emit a light, and Example 2 was evaluated. The results of the lifetime test on Example 2 and Comparative example are shown in FIG. 3. The residual luminance after 1000 hours of Example 2 was 80%, while the residual luminance of Comparative example was 50%.

According to the result of evaluation on the initial luminance, the luminance of the phosphor emitting red light of Example 2 was about 150, while the residual luminance of Comparative example without using $B_2O_3$ was 100.

Figure 4:
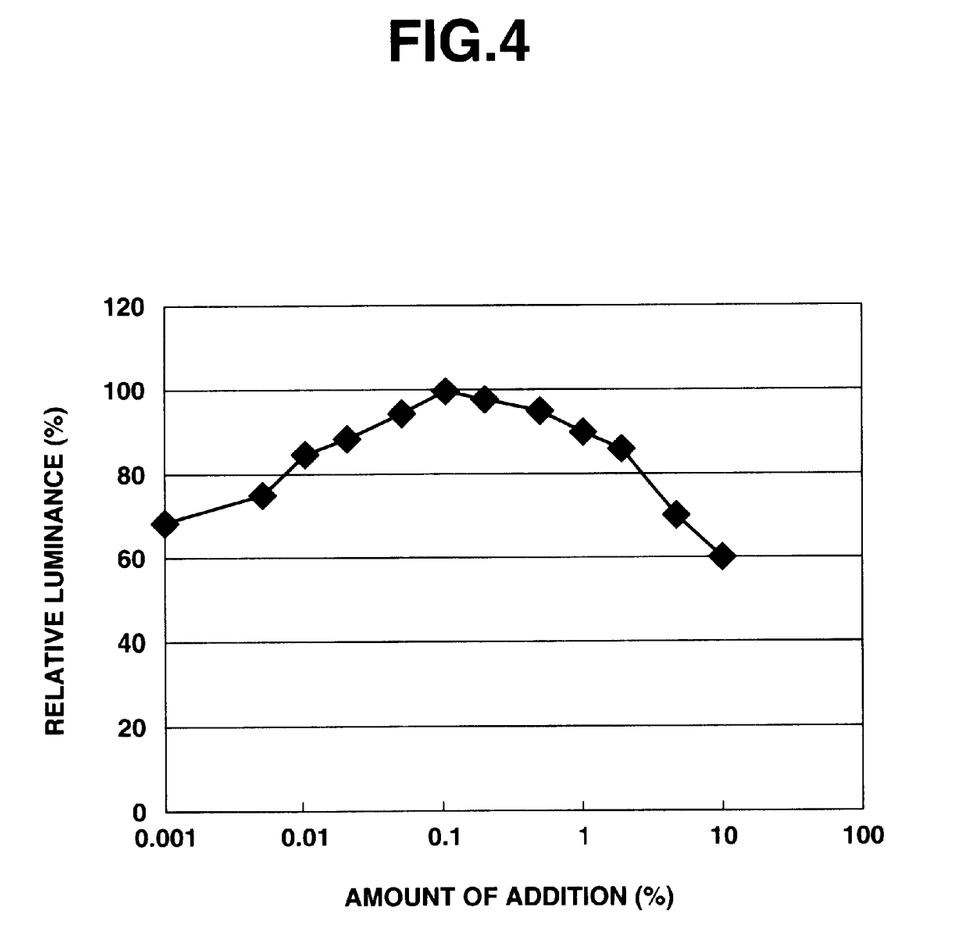
FIG. 4 is a graph showing a change in the initial luminance versus the change in the amount of addition of metal in Example 2.

The change in the initial luminance versus the change in the amount of addition of $B_2O_3$ in Example 2 is shown in FIG. 4. As shown in FIG. 4, when the amount of addition of $B_2O_3$ is 0.1%, the highest initial luminance (the position of relative luminance 100% in FIG. 4) can be obtained. The relative luminance of more than 70% including such a maximum value is particularly preferable for the phosphor of vacuum fluorescent display. In this instance, the range of the amount of the addition of $B_2O_3$ is 0.001%~5%.

Example 3

Figure 5:
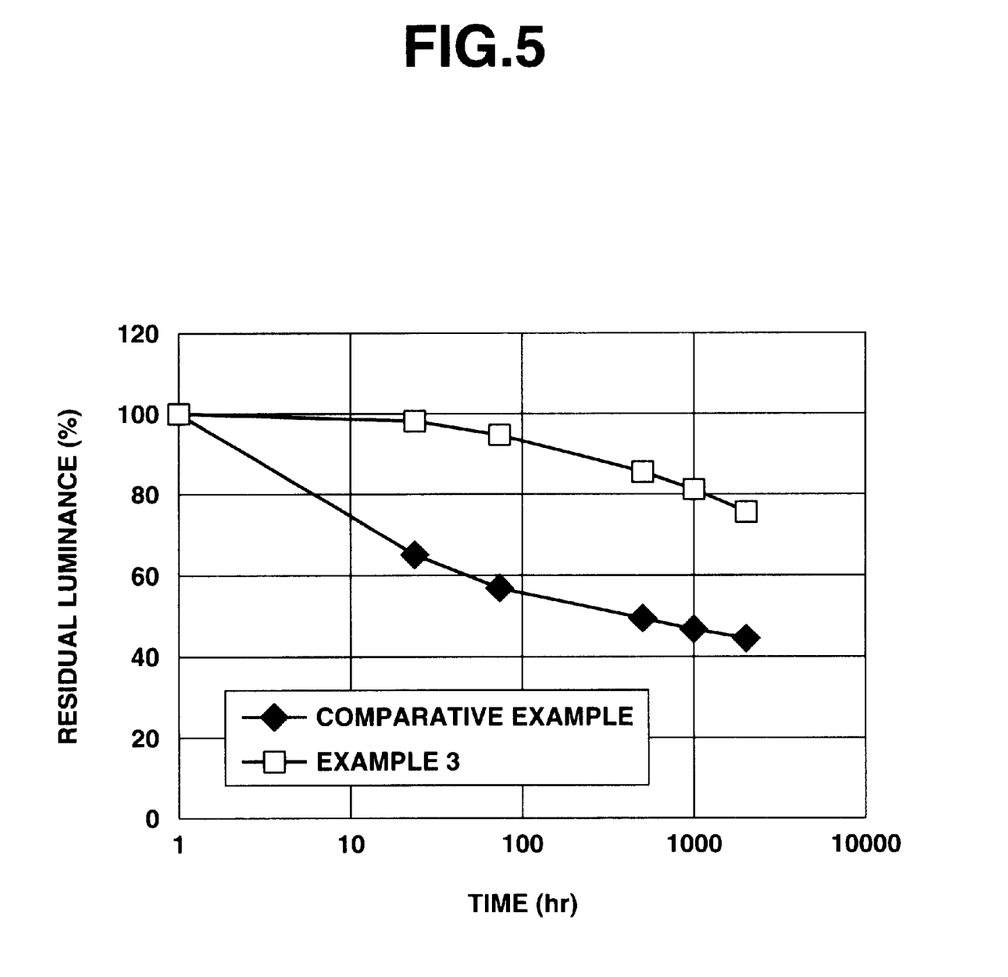
FIG. 5 is a graph showing results of the lifetime test according to Example 3 and Comparative Example.

CaS:Eu, Ce phosphor prepared by the same procedures as described in Example 1 to which was added 1% of $Bi_2O_3$ powder was used. 10% of $In_2O_3$ as a conductive material were added to the phosphor. A vacuum fluorescent display was made by using the phosphor in the same manner as described in Example 1. A vacuum fluorescent display similar to Example 1 without using $B_2O_3$ was prepared for comparison. The vacuum fluorescent displays of Example 3 and for comparison were driven to emit a light, and Example 3 was evaluated. The results of the lifetime test on Example 3 and Comparative example are shown in FIG. 5. The residual luminance after 1000 hours of Example 3 was 80%, while the residual luminance of Comparative example was 50%.

According to the result of evaluation on the initial luminance, the luminance of the phosphor of Example 3 was about 150, while the residual luminance of Comparative example without using $B_2O_3$ was 100.

Figure 6:
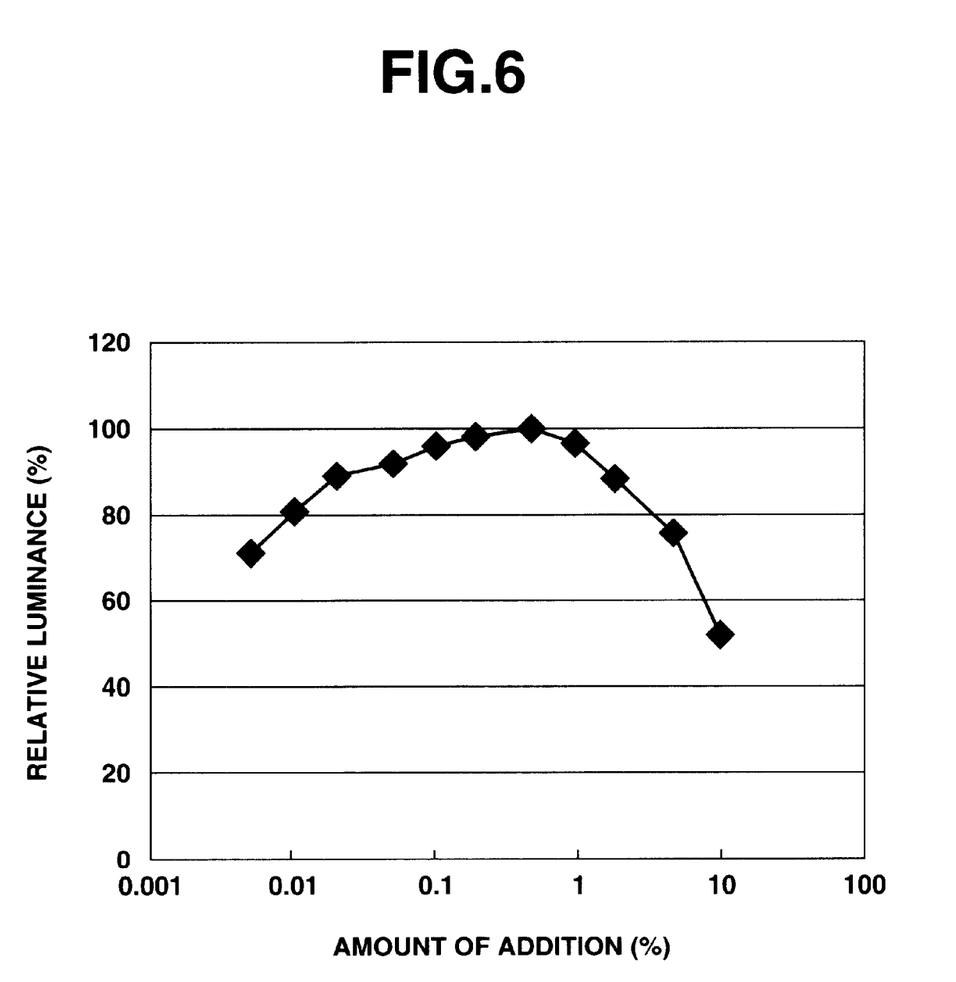
FIG. 6 is a graph showing a change in the initial luminance versus the change in the amount of addition of metal in Example 3.

The change in the initial luminance versus the change in the amount of addition of $B_2O_3$ in Example 3 is shown in FIG. 6. As shown in FIG. 6, when the amount of addition of $B_2O_3$ is 0.5%, the highest initial luminance (the position of relative luminance 100% in FIG. 6) can be obtained. The relative luminance of more than 70% including such a maximum value is particularly preferable for the phosphor of vacuum fluorescent display. In this instance, the range of the amount of the addition of $B_2O_3$ is 0.005%~5%.

Example 4

CaSrCO$_3$ prepared by coprecipitating Ca with Sr was used as a raw material. Ca$_{0.2}$Sr$_{0.8}$S:Eu, Ce phosphor was obtained by the same procedures as described in Example 1. 1% of low-melting fritted glass containing Sb$_2$O$_3$ was added to the phosphor which was then mixed with 20% of ZnO as a conductive material. By the use of the phosphor, a vacuum fluorescent display was made in the same manner as described in Example 1 except that the baking step was carried out at 450° C. A vacuum fluorescent display similar to Example 1 was prepared for comparison. The vacuum fluorescent displays of Example 4 and for comparison were driven to emit a light, and Example 4 was evaluated.

According to Example 4, the luminance of the phosphor emitting orange color light of Example 4 was about 250, while the residual luminance of Comparative example was 100. In the lifetime test, the residual luminance after 1000 hours of Example 4 was good, that is 75%, while the residual luminance of Comparative example was 50%. It may be considered that the major factor in the degradation of luminance is deterioration in the filament.

In the phosphor represented by the general formula CaSrS:B, C, an activator B and C are Eu and Ce, respectively. However, the dopant B may be selected from the group consisting of Ce, Pr, Sm, Eu, Gd, Tb, Dy, Ho, Er, Tm, Yb, Sc, Mn, Cu, Ga, Y, Ag, In, Sn, Sb, La, Au, Pb and Bi, and the dopant C may be selected from the group consisting of Ce, Cl, Br, I, Na, F, Li and K.

Example 5

CaS:Eu, Ce phosphor emitting a green color light was prepared in the same manner as described in Example 1. 0.5% of Sb$_2$O$_3$ were added to the phosphor which was then mixed with 30% of In$_2$O$_3$ as a conductive material. By the use of the phosphor, a vacuum fluorescent display was made in the same manner as described in Example 1. A vacuum fluorescent display similar to Example 1 was prepared for comparison. The vacuum fluorescent displays of Example 5 and for comparison were driven to emit a light, and Example 5 was evaluated. According to Example 5, the luminance of the phosphor of Example 5 was about 200, while the residual luminance of Comparative example was 100. In the lifetime test, the residual luminance after 1000 hours of Example 5 was good, that is, 100%, while the residual luminance of Comparative example was 50%.

Example 6

MgS:Eu phosphor was prepared by sulfurating MgO as a raw material at a temperature of 1500° C. for five hours in an atmosphere of H$_2$S. 1% of B$_2$O$_3$ powder was added to the phosphor which was then mixed with 10% of In$_2$O$_3$ as a conductive material. By the use of the phosphor, a vacuum fluorescent display was made in the same manner as described in Example 1. A vacuum fluorescent display similar to Example 1 was prepared for comparison. The vacuum fluorescent displays of Example 6 and for comparison were driven to emit a light, and Example 6 was evaluated.

According to Example 6, substantially the same result as Example 1 was obtained. While in Example 6, an activator for the phosphor containing MgS as a matrix was Eu, the same effect as that of Example 6 can be obtained even if the activator is Ce or Mn.

It is to be noted that there are various kinds of such phosphors emitting a light in the visible region as described in each Example which contains as a matrix the sulfide of alkaline earth metal and to which is added an activator depending on the combination of the matrix and the luminance center. However, the same effects can be obtained by the phosphors other than those described in each Example from a view point of surface oxidation. The same or superior effects as or to those of each Example can be obtained by selecting as a metal to be added at least one metal from the group consisting of B, Sb, Bi and Pb and adding at least one metal to the phosphor in 0.01 to 5%. The above-described metal to be added to the phosphor is used as a metal oxide such as B$_2$O$_3$, Sb$_2$O$_3$, Bi$_2$O$_3$ and P$_2$O$_5$.

According to the present invention, a phosphor without using cadmium having excellent luminous characteristic which emits a light in the visible region can be obtained by adding 0.01 to 5% of at least one element selected from the group consisting of B, Sb, Bi and Pb to the phosphor comprising sulfide of alkaline earth metal as a matrix and an activator.

What is claimed is:

1. A phosphor consisting essentially of sulfide of a metal belonging to Group II of the periodic table as a matrix and a dopant to emit a visible light, wherein the phosphor contains at least one element selected from a group consisting of B, Sb, Bi and P in 0.01% to 5.0% on the basis of weight of the phosphor.

2. A phosphor as described in claim 1, wherein said matrix of the phosphor belonging to Group II of the periodic table is sulfide of an element selected from the group consisting of Mg, Ca, Zn and Sr and said dopant is selected from one or two of elements selected from a group consisting of Eu, Ce and Mn.

3. A phosphor as described in claim 1, wherein said matrix of the phosphor is CaSrS, and said dopant is selected from one or two of element selected from the group consisting of Eu, Ce and Mn.

4. In a method of preparing a phosphor consisting essentially of sulfide of a metal belonging to Group II of the periodic table as a matrix and a dopant to emit a visible light, the improvement comprising adding at least one oxide selected from a group consisting of B$_2$O$_3$, Sb$_2$O$_3$, Bi$_2$O$_3$ and P$_2$O$_5$ to said phosphor for mixing and baking the mixture of said phosphor and said oxide.

5. A vacuum fluorescent display comprising an enclosed container maintained under high vacuum, an anode deposited a phosphor layer thereon and a cathode for emitting electrons to be impinged upon the phosphor layer of the anode, wherein said phosphor layer is formed of a phosphor which consists essentially of sulfide of a metal belonging to Group II of the periodic table as a matrix and a dopant, and at least one element selected from a group consisting of B, Sb, Bi and P in 0.01% to 5.0% on the basis of weight of the phosphor.

* * * * *